(12) United States Patent
Jeong et al.

(10) Patent No.: US 10,158,870 B2
(45) Date of Patent: Dec. 18, 2018

(54) METHOD AND APPARATUS FOR PROCESSING MOTION COMPENSATION OF A PLURALITY OF FRAMES

(71) Applicant: CHIPS & MEDIA, INC, Seoul (KR)

(72) Inventors: Wook Je Jeong, Gwacheon-si (KR); Min Yong Jeon, Seoul (KR); Dong Jin Park, Namyangju-si (KR)

(73) Assignee: CHIPS & MEDIA, INC, Seoul (KR)

( * ) Notice: Subject to any disclaimer, the term of this patent is extended or adjusted under 35 U.S.C. 154(b) by 518 days.

(21) Appl. No.: 14/841,303

(22) Filed: Aug. 31, 2015

(65) Prior Publication Data

US 2015/0373368 A1 Dec. 24, 2015

Related U.S. Application Data

(63) Continuation of application No. PCT/KR2013/007102, filed on Aug. 6, 2013.

(Continued)

(51) Int. Cl.
*H04N 19/44* (2014.01)
*H04N 19/61* (2014.01)
(Continued)

(52) U.S. Cl.
CPC ........... *H04N 19/44* (2014.11); *H04N 19/117* (2014.11); *H04N 19/124* (2014.11); *H04N 19/13* (2014.11);
(Continued)

(58) Field of Classification Search
CPC ..................................................... H04N 19/44
See application file for complete search history.

(56) References Cited

U.S. PATENT DOCUMENTS

| 5,502,499 A | 3/1996 | Birch |
| 5,973,740 A | 10/1999 | Hrusecky |

(Continued)

FOREIGN PATENT DOCUMENTS

| CN | 001820504 A | 8/2006 |
| CN | 101777366 A | 7/2010 |

(Continued)

*Primary Examiner* — James M Pontius
(74) *Attorney, Agent, or Firm* — Novick, Kim & Lee, PLLC; Sang Ho Lee

(57) ABSTRACT

Provided is a video processing apparatus for processing motion compensation of a plurality of frames. The video processing apparatus includes an image receiving receiver, a filter, a block divider, a compression processor, and a frame buffer memory. The image receiving receiver receives encoded data The filter an image frame reconstructed from the encoded data, and a block divider divides a reference frame into a plurality of blocks in a predetermined block dividing unit. The each of the plurality of blocks has an identical size. A compression processor compresses each of the plurality of blocks in a method selected from one of an uncompression method or a lossless compression method on a basis of reduction or non-reduction of bandwidths with respect to a frame buffer memory that contains the reference frame and packages the plurality of blocks in a unit of a burst group. A size of the burst group corresponds to a burst length of the frame buffer memory. The frame buffer memory records the packaged data and provides the reference frame for the emotion compensation. The lossless compression method includes a lossless variable-length compression method, such as a DPCM entropy coding method.

19 Claims, 14 Drawing Sheets

Related U.S. Application Data

(60) Provisional application No. 61/807,663, filed on Apr. 2, 2013.

(51) Int. Cl.
    *H04N 19/426* (2014.01)
    *H04N 19/573* (2014.01)
    *H04N 19/58* (2014.01)
    *H04N 19/13* (2014.01)
    *H04N 19/172* (2014.01)
    *H04N 19/18* (2014.01)
    *H04N 19/117* (2014.01)
    *H04N 19/124* (2014.01)
    *H04N 19/176* (2014.01)
    *H04N 19/433* (2014.01)

(52) U.S. Cl.
    CPC ......... *H04N 19/172* (2014.11); *H04N 19/176* (2014.11); *H04N 19/18* (2014.11); *H04N 19/428* (2014.11); *H04N 19/433* (2014.11); *H04N 19/573* (2014.11); *H04N 19/58* (2014.11); *H04N 19/61* (2014.11)

(56) References Cited

U.S. PATENT DOCUMENTS

| | | |
|---|---|---|
| 6,115,496 A | 9/2000 | Nguyen |
| 6,151,660 A | 11/2000 | Aoki |
| 6,799,246 B1 | 9/2004 | Wise |
| 7,333,545 B2 | 2/2008 | Duruoz |
| 7,403,487 B1 | 7/2008 | Foladare |
| 2003/0138045 A1 | 7/2003 | Murdock |
| 2005/0232501 A1 | 10/2005 | Mukerjee |
| 2007/0046698 A1 | 3/2007 | Nam |
| 2008/0285652 A1 | 11/2008 | Oxman |
| 2010/0053357 A1 | 3/2010 | Ikeda |
| 2011/0002396 A1 | 1/2011 | Ivanov |
| 2011/0206289 A1* | 8/2011 | Dikbas ............ H04N 19/00484 382/238 |
| 2012/0230423 A1 | 9/2012 | Esenlik |
| 2012/0320067 A1 | 12/2012 | Iourcha |
| 2013/0022104 A1 | 1/2013 | Chen |

FOREIGN PATENT DOCUMENTS

| | | |
|---|---|---|
| CN | 101971633 A | 2/2011 |
| CN | 102948149 A | 2/2013 |
| JP | 09-093425 A | 4/1997 |
| JP | 2001-022553 A | 1/2001 |
| JP | 2003-348592 A | 12/2003 |
| JP | 2006-262449 A | 9/2006 |
| JP | 2012-199608 A | 10/2012 |
| KR | 10-1994-0003388 A | 2/1994 |
| KR | 102005-0015616 A | 2/2005 |
| KR | 10-2008-0046345 A | 5/2008 |
| KR | 10-20100003167 A | 1/2010 |
| KR | 10-2010-0117107 A | 11/2010 |
| KR | 10-20110047697 A | 5/2011 |
| KR | 10-2012-0120091 A | 11/2012 |

* cited by examiner

| BW Saving : 60.70% | | qp 22 : 58.75% | | qp 27 : 60.17% | | qp 32 : 61.30% | | qp 37 : 62.56% | |
|---|---|---|---|---|---|---|---|---|---|
| BW (Mbyte/sec) | 30frame | PureBW | Comp | PureBW | Comp | PureBW | Comp | PureBW | Comp |
| 4K 30fps | 405.70 | 2,108.42 | 1,106.68 | 1,937.94 | 973.51 | 1,790.27 | 849.86 | 1,596.94 | 715.39 |
| FHD 30fps | 89.65 | 477.82 | 182.88 | 407.88 | 152.48 | 370.59 | 137.49 | 350.26 | 126.48 |
| Conference 720p 60fps | 79.10 | 306.85 | 107.69 | 281.03 | 94.50 | 269.62 | 89.42 | 257.67 | 83.20 |
| Screen 720p 30fps | 39.55 | 100.11 | 39.17 | 98.21 | 37.40 | 95.91 | 35.55 | 94.46 | 34.54 |

| BW Saving : 32.22% | | qp 22 : 32.93% | | qp 27 : 32.33% | | qp 32 : 31.94% | | qp 37 : 31.67% | |
|---|---|---|---|---|---|---|---|---|---|
| BW (Mbyte/sec) | 30frame | PureBW | Comp | PureBW | Comp | PureBW | Comp | PureBW | Comp |
| 4K 30fps | 405.70 | 2,108.42 | 1,512.38 | 1,937.94 | 1,379.22 | 1,790.27 | 1,255.57 | 1,596.94 | 1,121.09 |
| FHD 30fps | 89.65 | 477.82 | 272.53 | 407.88 | 242.13 | 370.59 | 227.14 | 350.26 | 216.13 |
| Conference 720p 60fps | 79.10 | 306.85 | 186.79 | 281.03 | 173.60 | 269.62 | 168.52 | 257.67 | 162.30 |
| Screen 720p 30fps | 39.55 | 100.11 | 78.72 | 98.21 | 76.95 | 95.91 | 75.11 | 94.46 | 74.09 |

METHOD AND APPARATUS FOR PROCESSING MOTION COMPENSATION OF A PLURALITY OF FRAMES

TECHNICAL FIELD

The present invention relates to a method and apparatus for processing a video, and more particularly, a method and apparatus for processing a video, capable of improving bandwidth efficiency of a frame buffer memory.

BACKGROUND ART

The present invention results from a research, which has been carried out as a part of work which was supported by the Technology Innovation Program (10049498, 4K UHD HEVC/VP9 SoC for Streaming Smart Device) funded by the Ministry of Trade, Industry and Energy (MOTIE, KOREA).

Recent improvement of video processing algorithms allows a video processing apparatus to process much larger-scale images.

Specifically, with need for ultrahigh definition (UHD), existing video compression techniques have difficulty in accommodating sizes of storage media and bandwidths of transfer media. Accordingly, a novel standard for compression of UHD video is needed. As a result, high efficiency video coding (HEVC) has completely been standardized on January in 2013. The HEVC may be available for a video stream serviced through networks, such as the Internet, 3G, long term evaluation (LTE), etc, in which not only UHD but also full high definition (FHD) or high definition (HD) videos can be compressed in accordance with HEVC.

A UHD TV is considered to mainly provide 4K (4096× 2304 pixels) UHD at 30 frames per second (fps) in the short term, while the number of pixels to be processed per second is expected to continuously increase to 4K 60 fps/120 fps, 8K 30 fps/60 fps, and the like. A bandwidth on demand per frame for a bidirectional frame prediction and filtering is expected to remarkably increase as well.

To deal with the increase in the processing bandwidths, a transmission bandwidth between system modules or to the exterior should also be improved based on performance or functions required for applications.

However, unlike the remarkable increase in the required processing bandwidth in response to an increase in image resolutions to be processed and frame rates, a bandwidth for transmission thereof is limited.

For example, a bandwidth for storing an image in a frame buffer memory or extracting the image from the frame buffer memory may be limited according to a minimum burst length of a memory application.

To overcome this problem, a method of compressing images which are input and/or output in/out the frame buffer memory is taken into account, but fails to provide a remarkable bandwidth reduction effect.

Also, current frame buffer compression techniques are using a loss compression algorithm for obtaining high compression efficiency. However, the loss compression algorithm brings about a gradual decrease of quality and a change of a compression data format.

Due to the format change, a process of searching for a frame buffer memory for random access is made complicated, thereby increasing a throughput and a processing time again.

DISCLOSURE

Technical Problem

The present invention has been made keeping in mind the drawbacks of the related art, and an object of the invention is to provide a video processing apparatus and method, capable of improving bandwidth efficiency even without degradation of quality, by use of lossless compression of a frame buffer.

Another aspect of the invention is to provide a video processing apparatus and method, which enables fast processing by providing a compression format of a frame buffer which is easy to access while maintaining a lossless state.

Also, another aspect of the invention is to provide a video processing apparatus and method, which enables maximizing effects of reducing bandwidth by diversifying compression methods for lossless compression of a frame buffer.

Moreover, another aspect of the invention is to provide a video processing apparatus and method, which enables improving a compression efficiency by processing block dividing efficiently for frame buffer compression.

Technical Solution

In order to achieve the above object, there is provided an apparatus for processing a video according to one embodiment disclosed herein, the apparatus including an image receiving module to receive an encoded image, a filtering module to filter an image frame reconstructed from the encoded image, a block dividing module to output a plurality of blocks in identical size by dividing the filtered image frame into a predetermined block dividing unit, a compression module to compress each of the plurality of blocks, to package the compressed plurality of blocks into a predetermined packaging unit, and a frame buffer memory to record the packaged data.

The present disclosure provides a method for processing a video in an image processing method for a video processing apparatus. The method for processing the video may include receiving an encoded image, filtering an image frame reconstructed from the encoded image, outputting a plurality of blocks in identical size by dividing the filtered image frame into a predetermined block dividing unit, compressing each of the plurality of blocks, packaging the compressed plurality of blocks into a predetermined packaging unit, and recording the packaged data.

Meanwhile, the video processing method may be implemented as a computer-readable recording medium having a program executable on a computer.

Advantageous Effects

According to various embodiments, the present invention can provide an apparatus and method for processing a video, which is capable of improving processing efficiency by reducing bandwidths of a memory without degradation of quality, even for an image with a large number of pixels (4K 60 fps/120 fps, 8K 30 fps/60 fps/ . . . , etc.) to be processed per second.

Also, according to various embodiments, the present invention can provide an apparatus and method for processing a video, which is capable of improving processing performance by facilitating an access to a compressed frame buffer memory.

According to various embodiments, the present invention can provide an apparatus and method for processing a video, which is capable of reducing overhead of input and/or output information in a frame buffer memory and facilitating a system configuration and improving stability of the system by reducing a variation of bandwidths.

Also, according to various embodiments, the present invention can provide an apparatus and method for processing a video, which is capable of improving a performance of video processing, by selectively applying compression methods which may be different for each divided texture block, and by selecting a compression method to maximize effects for reducing bandwidth.

Moreover, according to various embodiments, the present invention can provide an apparatus and method for processing a video, which is capable of improving a performance of video processing by performing a variable-length coding for dual processed residual signal, and providing efficient methods for dividing and padding of texture blocks.

MODE FOR INVENTION

Figure 1:
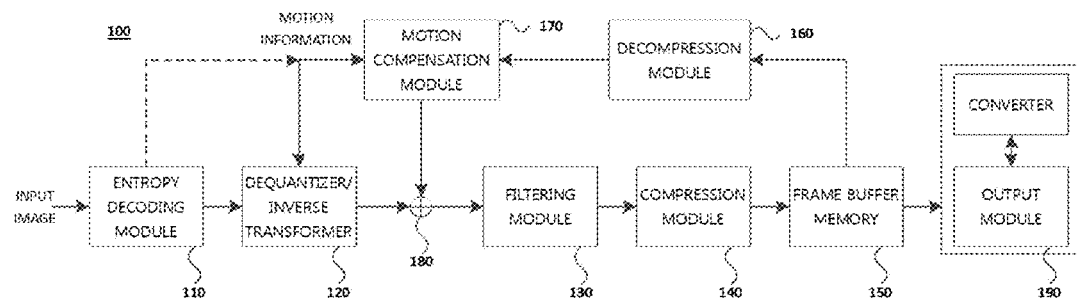
FIG. 1 is a block diagram illustrating a configuration of a video decoding apparatus in accordance with one exemplary embodiment disclosed herein.

Hereinafter, description will be given in detail of the preferred embodiments of the present invention to be easily practiced by those skilled in the art to which the present invention belongs, with reference to the accompanying drawings. However, the present invention can be embodied in many different forms and should not be construed as limited to those exemplary embodiments set forth herein. Configurations or elements unrelated to the description are omitted in the drawings as to clarify the present invention and like reference numerals refer to like elements throughout.

It will be understood that when an element is referred to as being "connected with" another element, the element can be connected with the other element or intervening elements may also be present.

It will be understood that when an element is referred to as being "on" another element, the element can be directly on the another element or intervening elements may also be present between the two elements.

Unless specified otherwise, the terms "comprise," "include," "comprising," and/or "including" specify the presence of elements and/or components, but do not preclude the presence or addition of one or more other elements and/or components. The terms "about" and "substantially" used in this specification to indicate degree are used to express a numerical value or an approximate numerical value when a mentioned meaning has a manufacturing or material tolerance and are used to prevent those who are dishonest and immoral from wrongfully using the disclosure of an accurate or absolute numerical value made to help understanding of the present invention. The term "stage (of doing)" of "stage of" used in this specification to indicate degree does not mean "stage for."

It will be noted that the expression "a combination thereof" in a Markush statement means a mixture or combination of one or more selected from the group consisting of elements mentioned in the Markush statement, being construed as including one or more selected from the group consisting of the elements.

To encoding an actual picture (image) and a depth information map thereof, High Efficiency Video Coding (HEVC) providing optimal coding efficiency among existing video coding standards, which is under joint standardization by the Moving Picture Experts Group (MPEG) and Video Coding Experts Group (VCEG), may be used as an example, without being limited thereto. A decoding apparatus according to an embodiment of the present invention may perform decoding through various types (MPEG2, AVC, etc.) of codecs using a frame buffer memory.

Generally, a video processing apparatus may include an encoding apparatus or a decoding apparatus. The encoding apparatus includes an encoding process and a decoding process, and the decoding apparatus includes a decoding process. The decoding process of the decoding apparatus may be the same as the decoding process of the encoding apparatus. Thus, the following description will be made on the decoding apparatus FIG. 1 is a block diagram illustrating a configuration of a video decoding apparatus in accordance with one exemplary embodiment of the present invention.

As illustrated in FIG. 1, a video decoding apparatus 100 disclosed herein includes an entropy decoding module 110, a dequantizer/inverse transformer 120, an adder 180, a filtering module 130, a compression module 140, a frame buffer memory 150, a decompression module 160, a motion compensation module 170, and an output module 190.

According to one exemplary embodiment of the present invention, the video decoding apparatus 100 may further include an intra/inter changeover switch and an intra prediction module. Here, this one exemplary embodiment illustrates in more detail a method of compressing and packaging a reference frame for generating a prediction block and a motion compensating process upon inter-frame prediction (in an inter mode) using the method.

The entropy decoding module 110 decodes a coded (encoded) bit stream transmitted from a video encoding apparatus to separate into an intra-prediction mode index, motion information, a quantization coefficient sequence, and the like. The entropy decoding module 110 may provide the decoded motion information to the motion compensation module 170.

The entropy decoding module 110 may provide the intra-prediction mode index to the motion compensation module 170 and the dequantizer/inverse transformer 120. Also, the entropy decoding module 110 may provide a dequantization coefficient sequence to the dequantizer/inverse transformer 120.

The dequantizer/inverse transformer 120 may transform the quantization coefficient sequence into a two-dimensional (2D) array of dequantization coefficients. The dequantizer/inverse transformer 120 may select one of a plurality of scanning patterns for transformation. The dequantizer/inverse transformer 120 may select one of the plurality of scanning patterns on the basis of at least one of a prediction mode (that is, one of intra prediction and inter prediction) of a current block and an intra prediction mode.

The dequantizer/inverse transformer 120 may receive the intra prediction mode from the motion compensation module 170 or the entropy decoding module 110.

The dequantizer/inverse transformer 120 recovers (or reconstructs) the quantization coefficients using a quantization matrix, which is selected from a plurality of quantization matrices, to the 2D array of dequantization coefficients. Different quantization matrices may be applied depending on a size of a current block to be reconstructed, and a quantization matrix may be selected for blocks of the same size based on the prediction mode of the current block and the intra prediction mode.

The dequantizer/inverse transformer 120 inverse-transforms the reconstructed quantization coefficients to reconstruct a residual block.

The adder 180 adds the residual block reconstructed by the dequantizer/inverse transformer 120 and a prediction block generated by the intra prediction module or the motion compensation module 170, thereby reconstructing a picture block.

The filtering module 130 filters off the reconstructed image, generated by the adder 180. Artifacts due to picture loss generated during a quantization process may be reduced by the filtering. For example, the filtering module 130 may perform a deblocking filtering process for removing a blocking effect occurring in a reconstructed picture, an adaptive offset application process for compensating for a difference value from an original picture by each pixel, and an adaptive loop filtering process for compensating for a difference value from an original picture by each coding unit.

The frame buffer memory 150 is a memory to store a local decoding picture which has been subjected to filtering by the filtering module 130. The frame buffer memory 150 may store a plurality of frames or pictures for motion compensation. Data formats of stored and output frames may be changeable by the compression module 140 and the decompression module 160.

The frame buffer memory 150, for example, may include at least one of storage media, such as a flash memory type, a hard disk type, a multimedia card micro type, a card memory type (e.g., SD or XD memory), RAM and ROM (e.g., EEPROM, etc.).

The compression module 140 is a module to compress frames stored in the frame buffer memory 150 according to the video processing method of the present invention. The decompression module 160 is a module to extract a random access target frame from the frame buffer memory 150, in response to a request of the motion compensation module 170, and to perform a decompression (inverse compression) for the target frame.

Specifically, the compression module 140 according to an exemplary embodiment of the present invention may perform lossless compression and uncompression to prevent degraded quality. Also, the compression module 140 may generate compression and information and separately manage the compression information in the form of a lookup table to realize a bandwidth reduction.

For example, the compression module 140 may receive the loop-filtered frame, perform an adaptive entropy process using DPCM with respect to the frame, and thus acquire losslessly-compressed texture segments.

The compression module 140 may generate compression information, which includes offset information related to each of the texture segments, package the texture segments by a burst length, and store the packaged texture segments in the frame buffer memory 150 along with the compression information. The frame buffer memory 150 may be an external memory which is connected through an AXI bus interface.

By virtue of the compression processing of the compression module 140 and the operation of the decompression module 160 according to the exemplary embodiment disclosed herein, random access of the motion compensation module 170 to the frame buffer memory 150 can be facilitated.

Also, 50% of the bandwidth reduction efficiency can result from the lossless compression and the storage based on the burst length according to the exemplary embodiment disclosed herein. The configuration of the compression module 140 will be explained later.

The motion compensation module 170 reconstructs an intra prediction mode of a current block on the basis of the intra prediction mode index received from the entropy decoding module 120, and generates a prediction block according to the reconstructed intra prediction mode.

Specifically, the motion compensation module 170 may randomly access the compressed picture stored in the frame buffer memory 150 through the decompression module 160 on the basis of motion vector information, and accordingly generate a prediction block for a current block. When a point-precision motion compensation is applied, a selected interpolation filter is used to generate the prediction block. The generated prediction block may be transferred to the adder 180.

Meanwhile, although not illustrated, the intra/inter changeover switch may provide the prediction block, which has been generated by one of the intra prediction module and the motion compensation module 170, to the adder 180 based on an encoding mode.

In order to generate the prediction block for the motion compensation, the motion compensation module 170 may further include a demultiplexer, a motion information encoding mode determination unit, a merge mode motion information decoding unit, an advanced motion vector prediction (AMVP) mode motion information decoding unit, a prediction block generation unit, a residual block decoding unit, and a reconstructed block generation unit.

The motion information includes a reference picture index and a motion vector. The reference picture index indicates any one picture previously encoded and reconstructed.

When a current block is subjected to unidirectional inter predictive encoding, the motion information indicates one of reference pictures included in list 0 (L0). On the other hand, when the current block is subjected to bidirectional predictive encoding, the motion information may include a reference picture index indicating one of the reference pictures of the list 0 (L0), and a reference picture index indicating one of reference pictures of list 1 (L1).

Also, when the current block is subjected to the bidirectional predictive encoding, the motion information may include one or two pictures among reference pictures included in a combined list (LC) of the list 0 and the list 1.

The motion vector indicates a position of a prediction block within a picture indicated by each reference picture index. The motion vector may be a pixel unit (integer unit) or a sub pixel unit.

For example, the motion vector may have a resolution of ½, ¼, ⅛ or 1/16 pixel. When the motion vector is not an integer unit, the prediction block is generated from integer pixels.

The demultiplexer demultiplexes encoded motion information and encoded residual signals from a bit stream received. The demultiplexer transmits the demultiplexed motion information to the motion information encoding mode determination unit, and the demultiplexed residual signals to the residual block decoding unit.

The motion information encoding mode determination unit determines a motion information encoding mode of a current block. The motion information encoding mode determination unit may determine the motion information encoding mode of the current block according to skip_flag of a bit stream received. The motion information encoding mode may include, but not limited to, at least one of a skip mode, a merge mode and an AMVP mode.

The skip mode may be applied when a skip candidate having the same motion information as motion information on a current block is present and a residual signal is 0. Also, the skip mode may be applied when the current block has the same size as a coding unit. The current block may be regarded as a prediction unit.

The merge mode may be applied when a merge candidate having the same motion information as motion information on a current block is present. The merge mode may be applied when the current block has a different size from a coding unit or when a residual signal is present if the current block has the same size as the coding unit. The merge candidate may be the same as the skip candidate.

The AMVP mode may be applied when the skip mode and the merge mode are not adopted. An AMVP candidate having the most similar motion vector to a motion vector of a current block is selected as an AMVP predictor.

The prediction block generation unit generates a prediction block of a current block using the reconstructed motion information. When the motion vector is an integer unit, the prediction block generation unit may generate a prediction block of a current block by copying a block, which corresponds to a position represented by a motion vector in a picture indicated by a reference picture index.

However, when the motion vector is not an integer unit, the prediction block generation unit may generate pixels of the prediction block from integer pixels within the picture indicated by the reference picture index. In this instance, in a luma pixel, a predictive pixel may be generated using a 8-tap interpolation filter. In a chroma pixel, a predictive pixel may be generated using a 4-tap interpolation filter.

The residual block decoding unit performs entropy decoding with respect to residual signals. The residual block decoding unit inversely scans entropy-decoded coefficients so as to generate a 2D block of quantized coefficients. Different types of inverse scanning may be used depending on entropy decoding methods.

That is, different inverse scanning methods may be used for the inter predicted residual signals depending on CABAC-based decoding and CAVLC-based decoding. For example, diagonal raster inverse scanning may be available for CABAC-based decoding, while zigzag inverse scanning may be available for CAVLC-based decoding.

Also, different inverse scanning methods may be decided depending on a size of the prediction block.

The residual block decoding unit dequantizes a generated coefficient block using a dequantization matrix. A quantization parameter is reconstructed to derive the quantization matrix. A quantization step size is reconstructed by each coding unit of a predetermined size or larger. The predetermined size may be 8×8 or 16×16.

The residual block decoding unit may inversely transform the dequantized coefficient block to reconstruct a residual block. The reconstructed block generation unit may add the prediction block generated by the prediction block generation unit and the residual block generated by the residual block decoding unit.

In this manner, a current block may be reconstructed by using the reconstructed prediction block of the current block and the decoded residual block of the current block. The reconstructed current block may then be filtered and compressed to be stored in the frame buffer memory 15. Such current block may be transferred to the motion compensation module 170 after being decompressed or output to the output module 190.

The output module 190 may process data output from the frame buffer memory 150, and display or externally transmit the processed data. An image signal, a data signal, an OSD signal and the like, processed in the output module 190 may be converted into R, G, and B signals, respectively, thereby being generated as driving signals.

Also, the output module 190 may further include a converter to reconstruct data compressed by the compression module 140 into an image signal. The output module 190 may include PDP, LCD, OLED, flexible display, 3D display and the like to display the converted image signal.

Figure 2:
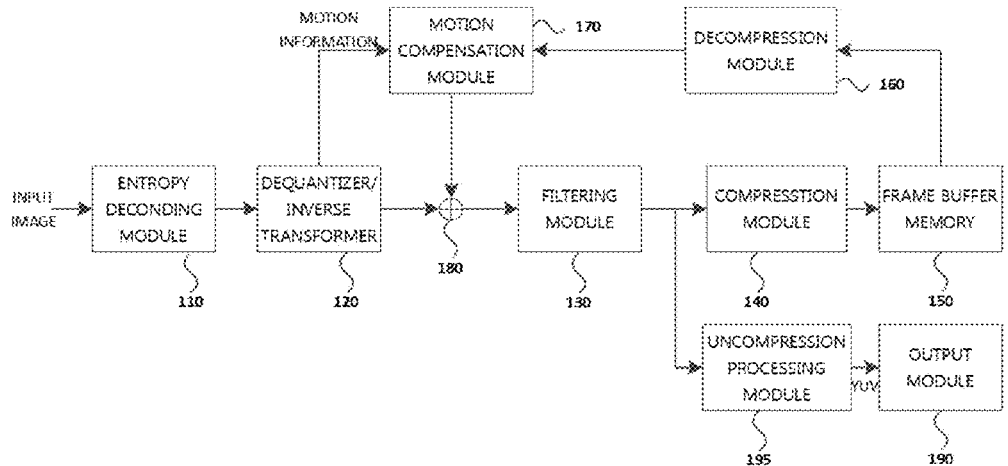
FIG. 2 is a block diagram illustrating a configuration of a video decoding apparatus in accordance with another exemplary embodiment disclosed herein.
Figure 3:
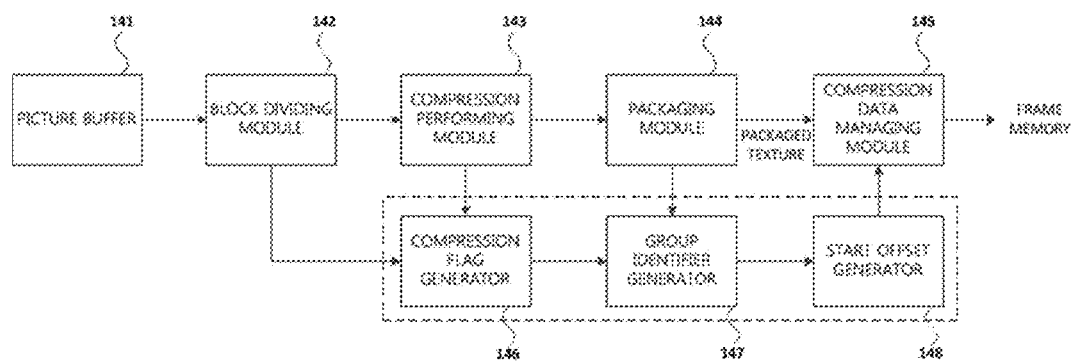
FIG. 3 is a block diagram illustrating in more detail a configuration of a compression module of a video decoding apparatus in accordance with an exemplary embodiment disclosed herein.

FIG. 2 is a block diagram illustrating a configuration of a video decoding apparatus in accordance with another exemplary embodiment disclosed herein.

As illustrated in FIG. 2, a video decoding apparatus 100 according to another embodiment according to the present invention includes an entropy decoding module 110, a dequantizer/inverse transformer 120, an adder 180, a filtering module 130, a compression module 140, a frame buffer memory 150, an decompression module 160, a motion compensation module 170, and an output module 190. The video decoding apparatus 100 may further include an uncompression processing module 195.

In FIG. 2, the other components except for the compression module 140, the uncompression processing module 195 and the output module 190 perform similar operations to those illustrated in FIG. 1, so detailed description thereof will be omitted.

As illustrated in FIG. 2, the uncompression processing module 195 included in the another embodiment disclosed herein may transfer an image, which has been filtered by the filtering module 130, directly to the output module 190 without passing through the compression module 140.

Specifically, the uncompression processing module 195 may transfer an image frame, which has been subjected to decoding and filtering, to the output module 190 in a line-by-line writing manner. To this end, the uncompression processing module 195 may include a separate buffer memory. A burst length of data may be predetermined as 64 bytes, 128 bytes or the like.

In this manner, when a pure YUV image signal which is uncompressed is transferred to the output module 190, the output module 190 may output the image signal directly through a display or the like even without performing the decompression (or inverse compression). Also, the output module 190 may easily perform post-processing such as scaling by using the pure YUV image signal, which may result in extending a utilization range.

Therefore, the exemplary embodiment illustrated in FIG. 2 may not include a separate decompression processor, and the compression module 140 may compress only a reference frame which is used for motion compensation and store the compressed reference frame in the frame buffer memory, thereby improving video processing efficiency.

Hereinafter, description will be given in detail of the configuration of the compression module of the video encoding apparatus in accordance with an embodiment disclosed herein.

In accordance with one exemplary embodiment of the present invention, the compression module 140 may include a picture buffer 141, a block dividing module 142, a compression performing module 143, a packaging module 144, a compression data managing module 145, a compression flag generator 146, a group identifier generator 147, and a start offset generator 148.

The picture buffer 141 may receive an image signal which has been filtered and output from the filtering module 130, and store the image signal in a buffer by each frame.

The block dividing module 142 acquires each frame from the picture buffer 141, and divides the acquired frame into a plurality of compression blocks according to a size of a preset compression unit. In this embodiment of the present invention, the size of the compression unit may be fixed, and each frame may be divided into 16×4 blocks, for example.

The compression performing module 143 decides whether or not to compress each block, and perform a lossless compression for blocks which have been decided to be compressed.

Specifically, according to the exemplary embodiment of the present invention, the compression performing module 143 may select one of lossless compression or uncompression for each divided block.

For example, the compression performing module 143 may select, as a compression method, a lossless variable-length compression method, such as a DPCM entropy coding method.

However, the compression performing module 143 may compare a size of data subjected to the variable-length compression with a size of uncompressed data, and select the uncompression method when the size of the data subjected to the variable-length compression is greater than the size of the uncompressed data.

In this manner, the compression performing module 143 may apply different compression methods for each block, and in some cases, employ the uncompression processing.

Also, the compression performing module 143 may select a method which can provide optimal bandwidth efficiency from the compression or the uncompression. Specifically, in order to overcome a degradation of quality due to the loss compression and a reduction of bandwidth efficiency due to an increased calculation, which are caused in the related art, the compression performing module 143 may also select a method for maximizing only the reduced bandwidth efficiency, irrespective of a compression degree.

Accordingly, the compression performing module 143 may transfer information indicating whether or not to compress a current block to the compression flag generator 146.

Then, the compression flag generator 146 may generate a compression flag which indicates whether or not to compress the current block. The compression flag, for example, may have a form of 1-bit flag indicating compression or uncompression. The compression flag may correspond to each block, and be transferred to the group identifier generator.

Meanwhile, the packaging module 144 groups data compressed by the compression performing module 143 for each block, and packages the grouped data.

The packaging module 144 may arrange the compressed blocks in one line, and group the arranged blocks on the basis of a burst length of the frame buffer memory 150. Each compressed block set grouped in the packaging module 144 may be referred to as a burst group (BG).

For example, a burst length may be 128 bytes. In this instance, the packaging module 144 groups the compressed blocks to be included in a group based on the 128-byte burst length for packaging.

The packaging module 144 transfers the packaged texture data to the compression data managing module 145 for each burst group. The compression data managing module 145 may perform writing for the frame buffer memory 150 for each burst group. This may bring about a reduction of a bandwidth variation resulting from the variable-length compression. Also, since compression efficiency of the lossless compression is maintained, the packaging module 144 can maintain an improved state of bandwidth efficiency (or a reduced state of bandwidths required) while maintaining system stability.

Also, the packaging module 143 may generate packaging information, which indicates a group to which each block belongs in response to being packaged and a position within the group, and transfer the packaging information to the group identifier generator 147.

The group identifier generator 147 may generate a group identifier which indicates a group, to which a currently-processed block belongs, from the packaging information. The group identifier may include a 8-bit burst group identifier (ID), for example.

The burst group identifier may indicate a relative position of each group with respect to a specific base address.

The start offset generator 148 may generate start offset information which indicates a start position of a current block within a group on the basis of the packaging information. The offset information, for example, may include 7-bit start byte offset information. The start byte offset information may indicate a relative start position of each block.

Meanwhile, the compression flag generator 146, the group identifier generator 147 and the start offset generator 148 may transfer the compression flag, the group identifier and the start offset information, which are related to the current block, to the compression data managing module 145, respectively.

The compression data managing module 145 may generate lookup table information by combining the compression flag, the group identifier and the start offset information, and record the generated lookup table information in the frame buffer memory 150.

In more detail, the compression data managing module 145 may generate the lookup table information corresponding to each block. The compression data managing module 145 may generate 2-byte lookup table information by using 1-bit compression flag, 8-bit group identifier and 7-bit offset information.

The generated lookup table information and the packaged data may be recorded in the frame buffer memory 150. As aforementioned, the packaged data may be recorded in the frame buffer memory 150 on the basis of the burst length.

When the 2-byte lookup table information is accumulated by each burst length (for example, 128 bytes of lookup table information for 64 blocks are accumulated), the compression data managing module 145 may record the lookup table information in the frame buffer memory 150. Therefore, the recording of the lookup table information may be maintained based on the burst length of the memory. This may result in maintaining the improved bandwidth without change and improving system stability.

That is, in the embodiment of the present invention, in the packaging module 144, the unit of packaging the compressed texture block may be the same as the unit of recording the lookup table information. Also, each unit may correspond to the burst length of the frame buffer memory 150. This configuration may cause the improvement of the bandwidth efficiency.

The compression data managing module 145 may refer to lookup table information relating to a previous block in order to generate lookup table information relating to a current block. In this instance, for blocks belonging to the same group, the same data cannot be repetitively processed, thereby reducing an amount of data processed.

The frame buffer memory 150 records data output from the thusly-configured compression module 140. Specifically, the compression data managing module 145 may control and manage the data recorded in the frame buffer memory 150.

Accordingly, the frame buffer memory 150 may store and maintain the compressed texture blocks, which have been packaged, by each frame, and also separately store and maintain lookup table information corresponding to each frame.

Also, the lookup table information may include 2-byte information for 16×4 block each. In one embodiment, the lookup table information may include burst group identification information and start offset information, which may allow for representing an offset, starting from a base address corresponding to each preset burst group, other than every address of the frame buffer memory 150.

Here, information related to the base address corresponding to each burst group may be separately stored and managed by the decompression module 160 and the compression module 140, respectively. Therefore, the decompression module 160 does not have to use all of the memory addresses to access the frame buffer memory 150.

Accordingly, the decompression module 160 can fast access a specific block even when it receives only the lookup table information from the frame buffer memory 150.

Also, by virtue of presetting the burst group identifiers and the corresponding base addresses and transmitting and receiving only the lookup table information associated therewith, overhead caused due to the transmission and reception of all of the values of the memory addresses can be reduced. This may result in improvement of data processing efficiency and reduction of bandwidths.

Meanwhile, the lookup table information included in the frame buffer memory 150 may be transferred to the decompression module 160. The decompression module 160 may access a specific position of the frame buffer memory 150 with reference to the lookup table information, thereby performing random access in response to a request of the motion compensation module 170. To this end, the decompression module 160 may include a first cache which requests the lookup table information from the buffer memory 150 and stores and manages the lookup table information.

In more detail, when a specific frame is identified in response to the request of the motion compensation module 160, the decompression module 160 may acquire group identification information, start offset information and a compression flag relating to each of blocks corresponding to the frame with reference to the lookup table information.

The decompression module 160 may then access a specific address of the frame buffer memory 150 corresponding to each block on the basis of the group identification information and the start offset information. Accordingly, in the embodiment according to the present invention, a problem that a long time is taken to search for a specific block, which has been caused in the related art compression method, can be overcome, and fast processing can be carried out while maintaining a bandwidth reduction effect.

The decompression module 160 may determine whether or not to decompress text blocks according to the compression flags, and if required, perform the decompression. The decompression module 160 may reconstruct the decompressed blocks to generate frame data requested by the motion compensation module 170. The decompression module 160 may then transfer the generated frame data to the motion compensation module 170.

Afterwards, the motion compensation module 170 may generate the prediction block based on the motion vector information, as aforementioned, and transfer the generated prediction block to the adder 180 to perform decoding of the image through the motion compensation in a sequential manner.

Hereinafter, description will be given of a video processing method according to an exemplary embodiment of the present invention, with reference to FIGS. 4 to 12.

Figure 4:
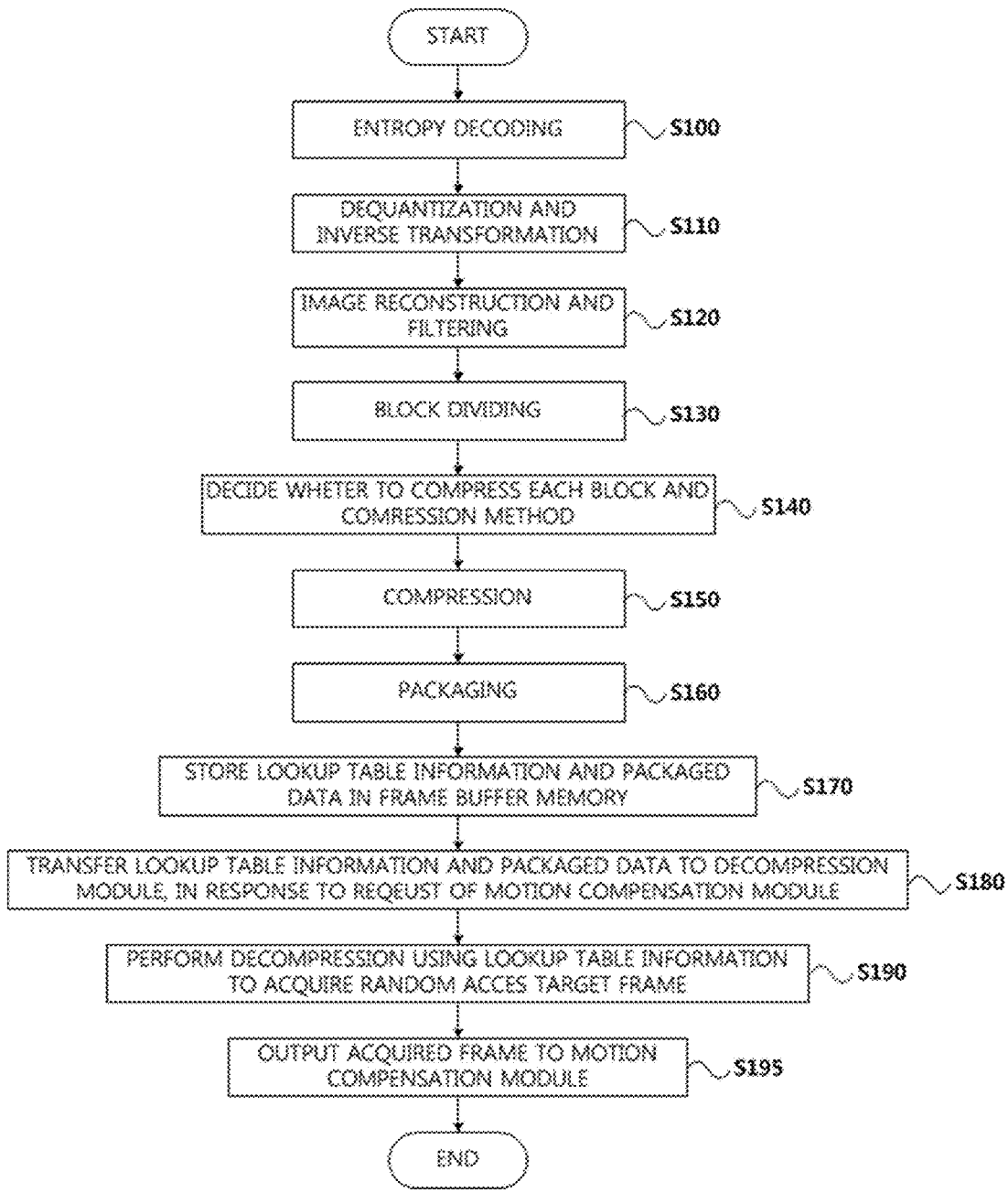
FIG. 4 is a flowchart illustrating a video decoding method in accordance with an exemplary embodiment disclosed herein.

As illustrated in FIG. 4, the video processing apparatus 100 receives a bit stream including encoded image data, and entropy-decodes the received bit stream (S100).

The video processing apparatus 100 performs dequantization and inverse transformation for the entropy-decoded image data (S110).

As aforementioned, the entropy decoding module 110 may decode the encoded bit stream which is transmitted from a video encoding apparatus, to separate into an intra prediction mode index, motion information, a quantization coefficient sequence and the like. The entropy decoding module 110 may provide the decoded motion information to the motion compensation module 170. The entropy decoding module 110 may also provide a dequantization coefficient sequence to the dequantizer/inverse transformer 120.

The dequantizer/inverse transformer 120 then transforms the quantization coefficient sequence into a 2D array of dequantization coefficients, selects one of a plurality of scanning patterns based on at least one of a prediction mode (i.e., one of intra prediction and inter prediction) of a current block and an intra prediction mode, and reconstructs the quantization coefficients using a quantization matrix, which is selected from a plurality of quantization matrices, to the 2D array of dequantization coefficients. The dequantizer/ inverse transformer 120 inversely transforms the reconstructed quantization coefficients to reconstruct a residual block.

Afterwards, the video processing apparatus 100 reconstructs the image using the residual block and a prediction block, and filters the reconstructed image (S120).

As aforementioned, the adder 180 may reconstruct an image block by adding the residual block reconstructed by the dequantizer/inverse transformer 120 and the prediction block generated by the intra prediction module or the motion compensation module 170. The filtering module 130 may filter off the reconstructed image generated by the adder 180. The detailed filtering method has been described.

Afterwards, the video processing apparatus 100 divides the filtered frame by each block (S130).

The compression module 140 may divide the image frame into blocks, in order to compress and package image frame textures filtered by the filtering module 130 and record the packaged image frame textures in the frame buffer memory 150.

The video processing apparatus 100 decides whether or not to compress each divided block and a compression method (S140), and performs the compression for each block according to the decided method (S150). The video processing apparatus 100 then packages the compressed texture blocks (S160).

Afterwards, the video processing apparatus 100 stores lookup table information and packaged data into frame buffer memory (S170).

Figure 5:
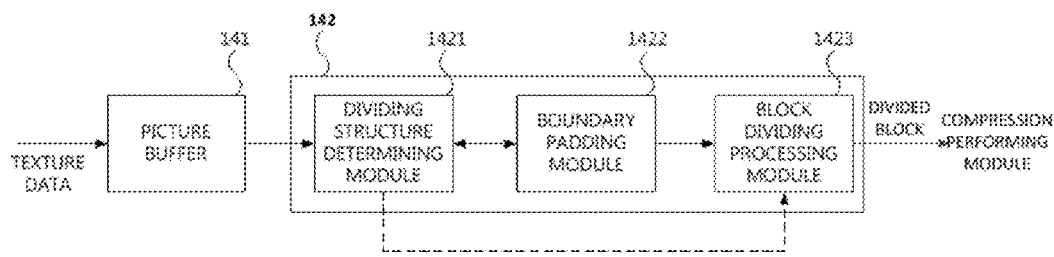
FIG. 5 is a view illustrating a block dividing module of the video processing apparatus in detail according to an exemplary embodiment disclosed herein.

FIG. 5 is a view illustrating a block dividing module 142 of the video processing apparatus 100 in detail according to an exemplary embodiment disclosed herein.

As shown in FIG. 5, the block dividing module 142 comprises a dividing structure determining module 1421, a boundary padding module 1422 and a block dividing processing module 1423.

The dividing structure determining module 1421 receives data of a picture from the picture buffer 141, and determines a dividing structure by analyzing the data of the picture received. In an embodiment of present invention, the picture analyzed may be corresponding to one image which constructing one video frame. The picture may include data of Y value, Cr value, and Cb value for each pixel which constructing the picture.

The dividing structure determining module 1421 may analyze the picture and identify horizontal and vertical lengths. The dividing structure determining module 1421 may determine a dividing structure based on the horizontal and vertical length. Especially, the dividing structure determining module 1421 may use a predetermined block unit to determine the dividing structure capable of dividing the horizontal and vertical lengths of the picture by the block unit.

For example, the block unit may have a size of 16×4 pixels. The dividing structure determining unit 1421 may determine the dividing structure to divide the picture into a plurality of blocks by segmenting the horizontal length of the picture into 16 pixel unit and the vertical length of the picture into 4 pixel unit.

Moreover, the dividing structure determining module 1421 may determine whether a size of the picture is multiple of a size of the block unit. It may not be that the size of the picture is multiple of a size of the block unit because the size of the picture have many variations according to its resolution.

Also, if the size of the picture is not multiple of a size of the block unit, a size of boundary divided portion may be smaller than the size of the block unit. Thus, the dividing structure determining module 1421 may determine a boundary block having the size of the block unit which includes the boundary divided portion. The dividing structure determining module 1421 may transfer information of the boundary block to the boundary padding module 1422.

Meanwhile, if the size of the picture is multiple of a size of the block unit, the dividing structure determining module 1421 may determine the dividing structure and generate dividing structure information. The block dividing processing module 1423 may process dividing the picture according to the dividing structure information to transfer each divided texture block into the compression performing module 143.

However, if the size of the picture is not multiple of a size of the block unit, the dividing structure determining module 1421 may transfer a boundary block information of the boundary block, which includes the boundary divided portion having different size with the size of the block unit, to the boundary padding module 1422.

For example, if a horizontal size of the picture is 1610 pixels and the picture is divided by 16×4 block unit based on the upper left end pixel, a horizontal boundary divided portion (horizontal 10 pixels×vertical length of the picture) is not fit into the size of the block unit. Then the dividing structure determining module 1421 may determine the boundary block including the boundary divided portion, and transfer information of the boundary block to the boundary padding module 1422.

After receiving the information of the boundary block, the boundary padding module 1422 performs padding for each of the boundary block by the block unit.

Here, the boundary padding module 1422 may perform padding based on the information received from the dividing structure determining module 1421. The boundary block may include the boundary portion as said and a non-picture region. And the boundary padding module 1422 may perform padding by inserting predetermined certain pixels into the non-picture region.

In particular, the boundary padding module 1422 can configure values of the pixels which padded in one direction to have same values corresponding to a horizontal (or vertical) boundary pixel of the boundary block. To this end, in the non-picture region of the boundary block, pixels having same value of the horizontal (or vertical) boundary pixel can be padded in horizontal (or vertical) direction.

According to the operation of the boundary padding module 1422, the boundary block can have texture data having size of the block unit, and the video processing apparatus 100 can process continuously compression and decompression of the block units having identical size. It makes reducing of variation of the texture size, and the bandwidth efficiency can be improved.

Also, an embodiment of the present invention, by configuring values of the padded pixels into values of horizontal or vertical boundary values of the picture, compression efficiency using DPCM coding can be improved by making zero residual signals in the horizontal or vertical direction.

When the padding is completed, the boundary padding module 1422 may transfer the padded block unit into the block dividing processing module 1423 or the dividing structure determining module 1421.

Meanwhile, the block dividing processing module 1423 may divide the boundary padded picture from the boundary padding module 1422 or the dividing structure determining module 1421 or original picture into a plurality of the block units. And all of the block units may have identical size. The plurality of the block units divided may be transferred sequentially to compression performing module 143.

Figure 6:
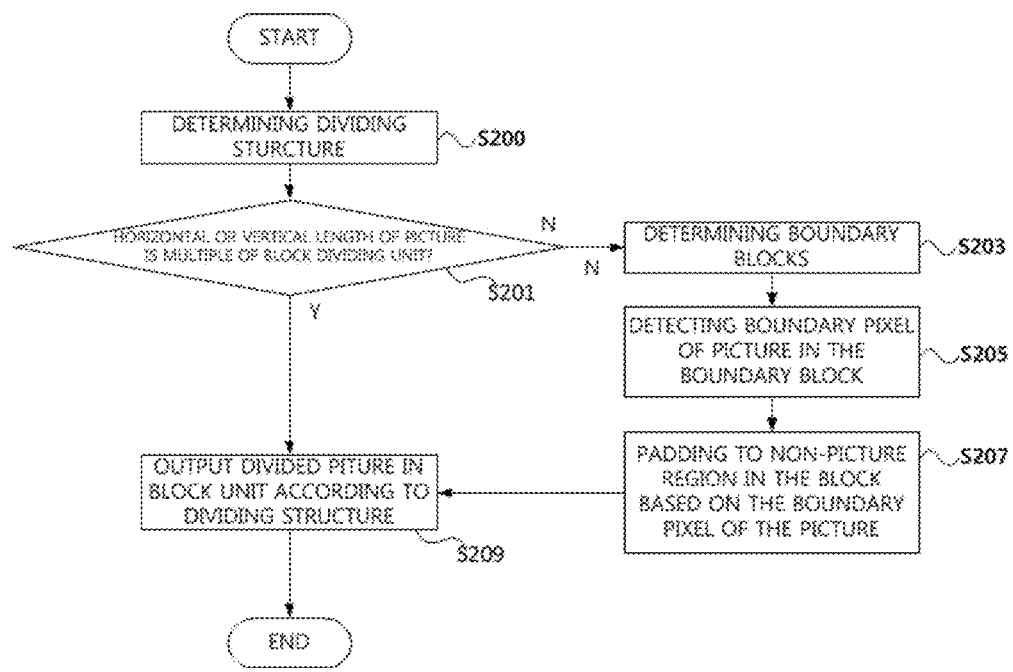
FIG. 6 is a flowchart for illustrating operation of the block dividing module in detail.

FIG. 6 is a flowchart for illustrating operation of the block dividing module in detail.

First, the block dividing module 142 determines a dividing structure and generates dividing structure information (S200).

Next, the block dividing module 142 determines whether the vertical and horizontal size of the picture is multiple of the predetermined size of the block unit.

As mentioned above, the dividing structure determining module 1421 may identify the horizontal and vertical size of the picture based on the picture from the picture buffer 141. And, it may determine whether the identified vertical and horizontal size of the picture is multiple of the predetermined size of the block unit.

If the size of the picture is not multiple of the dividing size of the block unit, the block dividing module 142 determines boundary blocks (S203).

If the size of the picture is not multiple of the dividing size of the block unit, the dividing structure determining unit 1421 may determine the remaining portion of the picture smaller than the dividing block unit size as the boundary region when the picture is divided by the dividing block unit and determine the region of the dividing bock unit including the boundary region as the boundary block. Thus, the boundary block may include both of the boundary region of the picture and the non-picture region.

And, the block dividing module 142 detects boundary pixels of the picture in the boundary block (S205).

The boundary padding module 1422 may obtain boundary block information from the dividing structure determining module 1421. The boundary block information may include position information of the boundary blocks, and identify information of boundary region and non-picture region.

Then the boundary padding module 1422 may detect pixels corresponding to a boundary of the picture in the boundary block based on the boundary block information. Here, the boundary pixels may include a plurality of pixels according to a horizontal or vertical length.

After, the block dividing module 142 performs padding to the non-picture region of the block based on the boundary pixels (S207).

As mentioned, the boundary padding module 1422 may pad same value as the boundary pixel into the non-picture region of the boundary block. Through this, the residual signal in a horizontal or vertical direction may become zero, and the compression efficiency for DPCM codding can be improved.

Then, the block dividing module 142 divides the picture according to the dividing structure information to output the picture by the block unit to the compression performing module 143.

Figure 7:
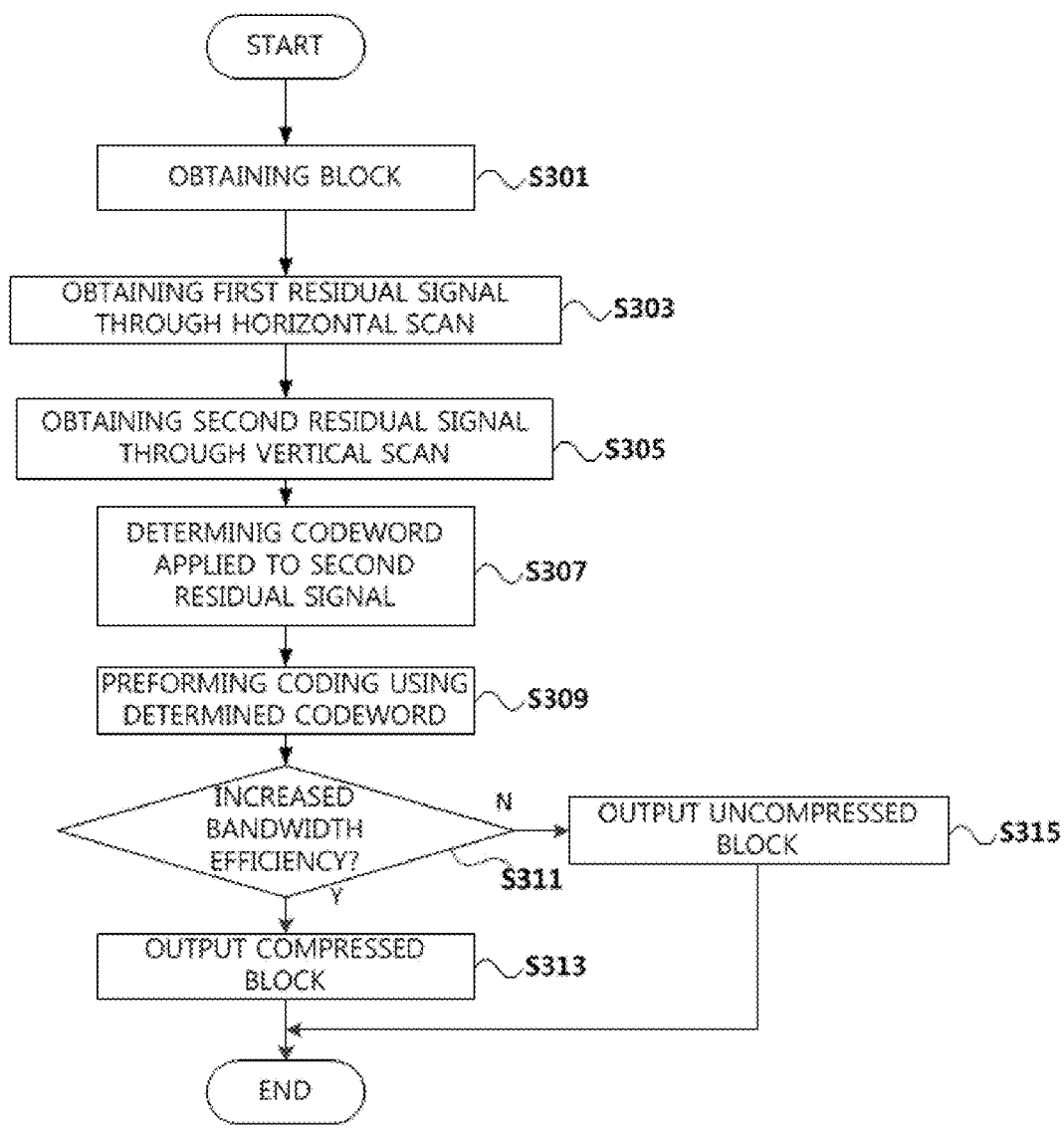
FIG. 7 is a flowchart for illustrating processes of compression for the divided blocks according to an exemplary embodiment of the present invention.

FIG. 7 is a flowchart for illustrating processes of compression for the divided blocks according to an exemplary embodiment of the present invention.

Referring to the FIG. 7, the compression performing module 143 obtains the blocks first (S301).

Each of texture blocks divided by the block dividing module 142 may be transferred sequentially to the compression performing module 143. The compression performing module 143 may perform compression using each method for the each blocks.

To this end, the compression performing module 143 obtains the first residual signal by horizontal scanning (S303).

For example, the compression performing module 143, for the horizontal scanning, may allocate a pixel value in (y, x) coordinates of the picture into a buffer, update the buffer as calculated value by calculating difference with next pixel (y, x−1) according to the horizontal scanning order. This may be performed to the each pixels of each blocks, and the horizontal scanned first residual signal may be generated.

After, the compression performing module 143 obtains the second residual signal by vertical scanning (S305).

For example, the compression performing module 143, for the vertical scanning, may allocate a pixel value in (y, x) coordinates of the horizontal scanned first residual signal a buffer, update the buffer as calculated value by calculating difference with next pixel (y−1, x) according to the vertical scanning order. This may be performed to the each pixels of each blocks, and the vertical scanned second residual signal may be generated.

Then, the compression performing module 143 selects a code word to apply to the second residual signal (S307).

The compression performing module 143, for lossless compression, may perform a variable-length coding using one of a plurality of code words. The plurality of the code words may include a plurality of exponential golomb codes corresponding to order numbers different from each other. The compression performing module 143 may determine one of the code words applying to the current block which is most efficient for bandwidth. For example, the compression performing module 143 may determine 3rd exponential golomb code as coding code word based on the bandwidth efficiency.

Next, the compression performing module 143 performs coding based on the determined code word (S309). Then, the compression performing module 143 determines whether the bandwidth efficiency is increased by comparing with the non-compression case (S311).

In the variable-length coding, although the codding has performed, the bandwidth which is needed for reading and writing the data to the memory can be increased. Therefore, in the present invention, improvements of the bandwidth efficiency can be determined by comparing with non-compression case of the current block.

If the bandwidth efficiency is increased, the compression performing module 143 outputs the compressed block (S313). And, if the bandwidth efficiency is not increased, the compression performing module 143 outputs the uncompressed block (S315).

Figure 8:
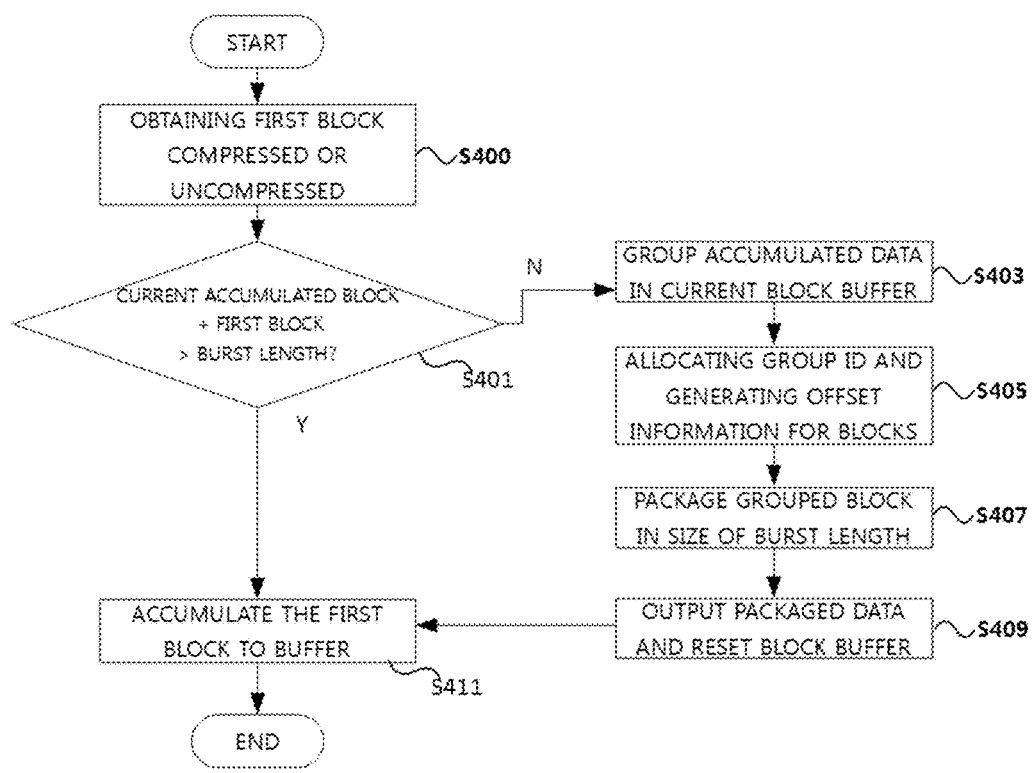
FIG. 8 is a flowchart for illustrating processes of packaging blocks according to an exemplary embodiment of the present invention.

FIG. 8 is a flowchart for illustrating processes of packaging blocks according to an exemplary embodiment of the present invention.

The packaging module 144 may obtain the compressed or uncompressed blocks and package the blocks into a burst length of the memory. Also, the packaging module 144 may generate and transfer the lookup table information to other modules according to the packaging.

First, the packaging module 144 obtains the first block compressed or uncompressed (S400).

Then, the packaging module 144 determines whether sum of block data amounts accumulated in current block buffer and data amounts of the first block is bigger than the burst length of the memory, groups the data accumulated in current block buffer (S403).

And, the packaging module 144 allocates a group identifier to the grouped data, and generates offset information for each block in the group. The group identifier may correspond to a base address of the memory, and the offset information may indicate relative addresses of blocks in the group. The group identifier and the offset information may be included in the lookup table information, and managed separately with the packaged data.

And, the packaging module 144 packages the grouped block data into the burst length (S407), output to the memory, and reset current block buffer (S409).

In particular, for improving bandwidth efficiency, if the grouped block data is smaller than the burst length, the packaging module 144 may package the data into the burst length by adding a dummy region to the grouped block data.

Meanwhile, if the block buffer is reset or sum of block data amounts accumulated in current block buffer and data amounts of the first block is smaller than the burst length of the memory, the first block is accumulated to the block buffer (S411).

FIGS. 9 to 12 are views illustrating a configuration of the divided and packaged blocks according to an exemplary embodiment of the present invention.

Figure 9:
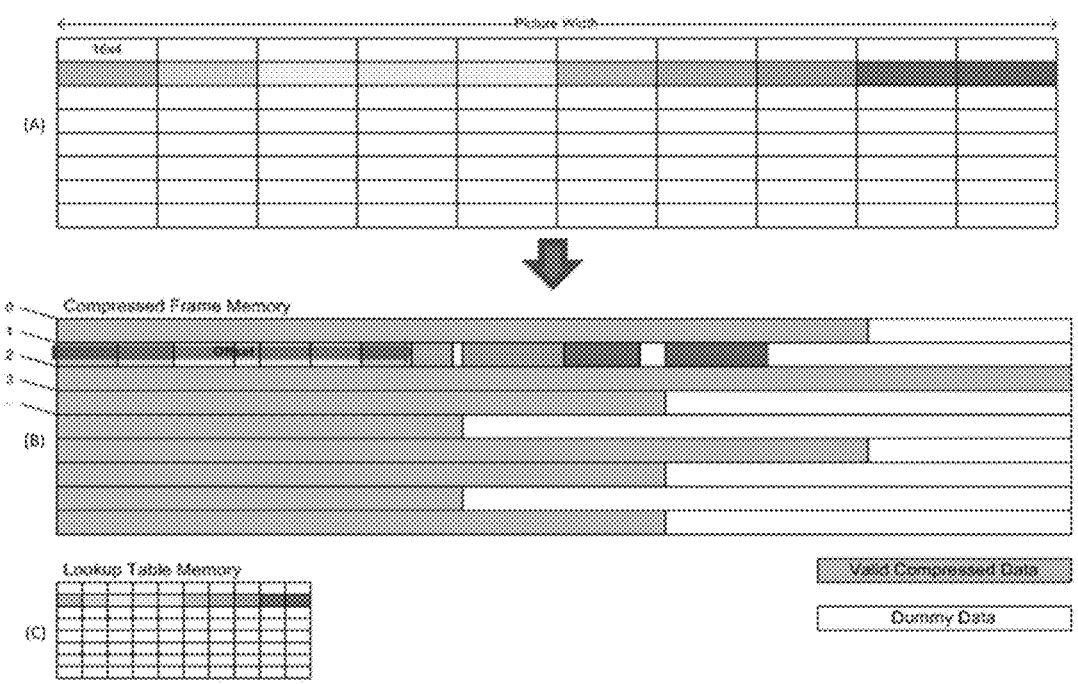
FIG. 9 is a view illustrating a frame buffer memory compressed according to an exemplary embodiment disclosed herein.

(A) of FIG. 9 illustrates a whole frame divided into blocks. As illustrated in (A) of FIG. 9, each frame may be divided into blocks each having a preset size. The preset size may be variable. 16×4 block is assumed in the embodiment disclosed herein. If a size of a picture is not a multiple of the preset size, an extra value of a block corresponding to an edge may be set to the same value as an edge pixel.

Figure 10:
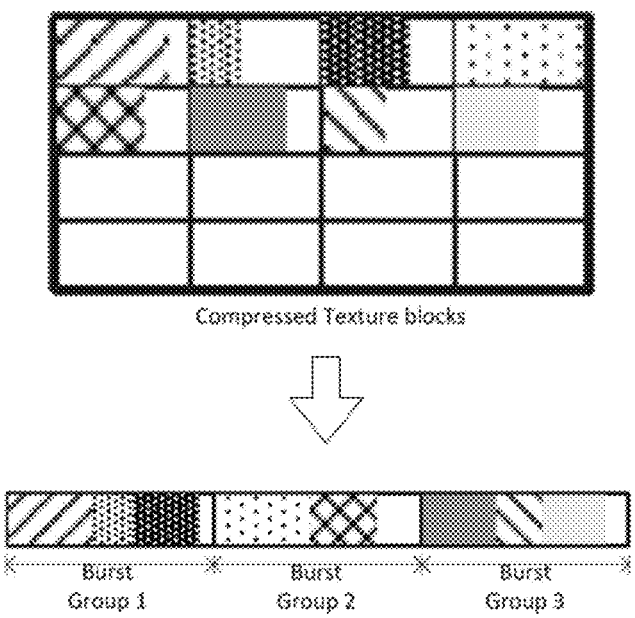
FIG. 10 is a view illustrating a compression method and grouping in accordance with an exemplary embodiment disclosed herein.

Meanwhile, as illustrated in FIG. 10, each of the divided blocks may be selectively compressed. Here, a compression method, as aforementioned, may be selected from one of uncompression, and variable-length coding compression using DPCM, on the basis of reduction or non-reduction of bandwidths.

Each compressed block may be packaged into each group according to a burst length. The packaging module 144 in this embodiment disclosed herein, as illustrated in a bottom of FIG. 10, may package the blocks by designating burst groups, respectively. A size of each burst group may correspond to a burst length of the frame buffer memory 150, and a group identifier may be assigned to each group.

Figure 11:
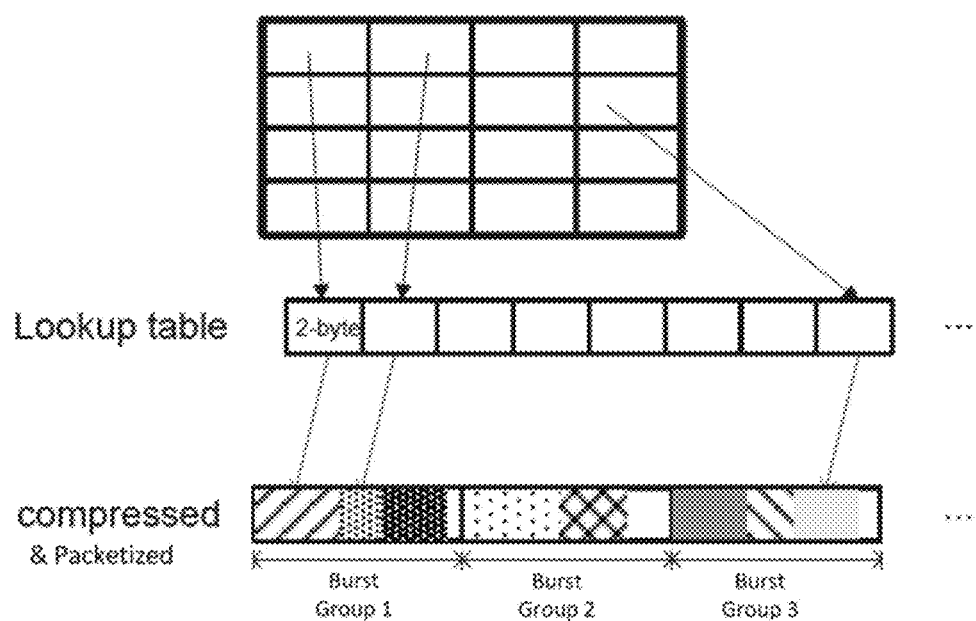
FIG. 11 is a view illustrating a lookup table in accordance with an exemplary embodiment disclosed herein.

Also, the packaging unit 144, as illustrated in FIG. 11, generates lookup table information corresponding to each block. The lookup table information may include information for identifying each divided block and a compressed or uncompressed state thereof from the packaged data. For example, the lookup table information may include 2-byte data containing 8-bit group identifier information, 7-bit start offset information and 1-bit compression flag. The lookup table information may be stored separately in the frame buffer memory 150.

Referring back to FIG. 9, (B) of FIG. 9 illustrates a storage space of the frame buffer memory 150 in which the packaged data is recorded in a sequential manner. As compared with the whole frame of (A) of FIG. 9, the whole frame of (B) of FIG. 9 can store the compressed texture data by each block.

Here, numbers 0, 1, 2 and 3 at the left of the drawing may indicate base addresses corresponding to burst groups, respectively. Each block may be identified according to burst group identification information and an offset value. A region in which no texture data is present in each burst group may be filled with dummy data.

Meanwhile, (C) of FIG. 9 illustrates lookup table information which is stored separately in the frame buffer memory 150. The lookup table information may be filled with 2-byte values corresponding to respective blocks, and arranged in the order of blocks constructing the whole frame.

Therefore, the decompression module 160 may receive only the lookup table information, as illustrated in (C) of FIG. 9, to identify texture blocks from the frame buffer memory 150, and can reconstruct an original frame by performing decompression and reconstruction for the blocks.

Also, as aforementioned, the transmission and reception of only the lookup table information may result in a reduction of overhead caused due to transmission and reception of every memory address. Consequently, improvement of data processing efficiency and reduction of bandwidths can be acquired.

Figures 12, 13:
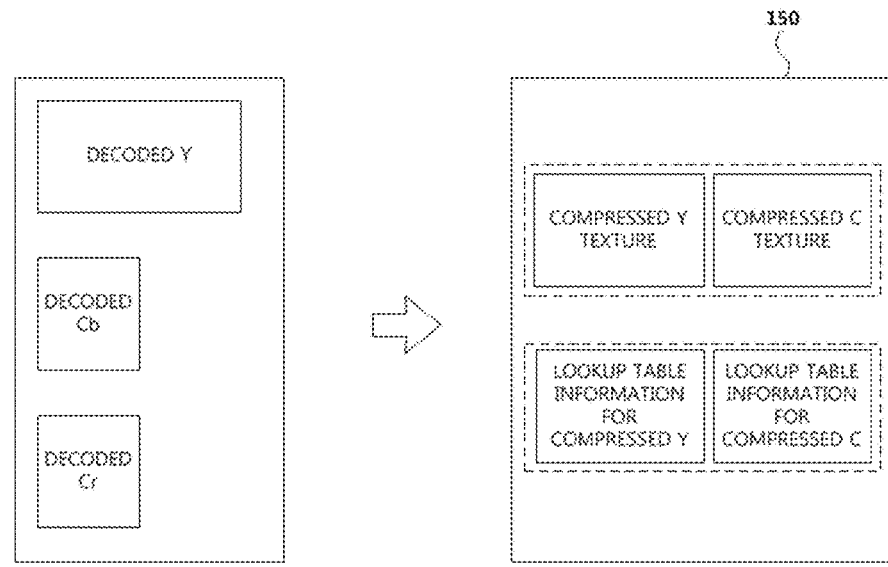
FIG. 12 is a view comparing information stored in a frame buffer memory according to an exemplary embodiment disclosed herein with the related art configuration.
FIGS. 13 to 20 are experimental data illustrating improved processing efficiency in case of applying an exemplary embodiment of the present invention.

FIG. 12 is a view illustrating a size variation of the frame buffer memory 150 according to an exemplary embodiment of the present invention, which illustrates a configuration of the frame buffer memory 150 for reducing bandwidths.

A left block diagram illustrates a typical frame buffer, and a right block diagram illustrates the frame buffer memory 150 which is compressed and packaged according to the exemplary embodiment of the present invention. As illustrated in FIG. 12, unlike the related art frame buffer which stores decoded Y, Cb and Cr values, the frame buffer memory 150 according to the exemplary embodiment of the present invention may include compressed Y texture data, compressed C texture data, lookup table information relating to the compressed Y, and lookup table information relating to the compressed C.

The frame buffer memory 150 according to the exemplary embodiment of the present invention may include a buffer for storing the lookup table information. A size of the buffer may be decided depending on an image frame size. For example, when 2-byte lookup table information is generated for a block of 16×4 pixels, a buffer size for lookup table information may be decided as $\frac{1}{32}$*(frame size) for one frame. Therefore, the frame buffer memory 150 according to the embodiment of the present invention may further include an additional buffer region as compared with the conventional frame buffer.

Also, when the 2-byte lookup table information is generated for the block of 16×4 pixels, a region-based buffer size of the frame buffer memory 150 may be derived by the following formulas.

Compressed data for Luma: (PicX+15)/16*16*PicY

Compressed data for Chroma: (PicX/2+15)/16*16*PicY

Lookup table for Luma: (PicY+15)/16*(PicX+255)/256*128

Lookup table for Chroma: (PicY+15)/16*(PicX/2+255)/256*28

Description will be back to FIG. 4.

Afterwards, the video processing apparatus 100 transfers the lookup table information and the packaged data to the decompression module 160 according to the reference frame request of the motion compensation module 170 (S180).

The decompression module 160 of the video processing apparatus 100 randomly accesses blocks constructing the corresponding frame using the lookup table information, and performs decompression of the blocks and frame reconstruction, thereby obtaining the reference frame (S190).

The video processing apparatus 100 transfers the obtained reference frame to the motion compensation module 170 (S195).

FIGS. 13 to 20 illustrate test data indicating results obtained by applying the video processing method in accordance with the exemplary embodiment of the present invention.

To test the bandwidth reduction effect of the video processing method according to the embodiment disclosed herein, various HEVC test sequences were used and classified into A to F according to image sizes. Bandwidths were estimated as a total amount of frame data in which reading/writing of a memory was performed through a 128-bit bus interface during a decoding process (while reading/writing of the reference frame was performed for motion compensation). Also, four different qp values (22, 27, 32 and 37) for each sequence were used.

Considering the whole results of FIGS. 13 to 20, it was understood that the video processing method according to the exemplary embodiment disclosed herein could save 56% of bandwidths on average rather than pure bandwidths when a loop filter module performs writing. Also, it was understood that the video processing method according to the exemplary embodiment of the present invention could save 59% of bandwidths on average rather than pure bandwidths when a motion compensation module performs writing.

Figures 14, 15:
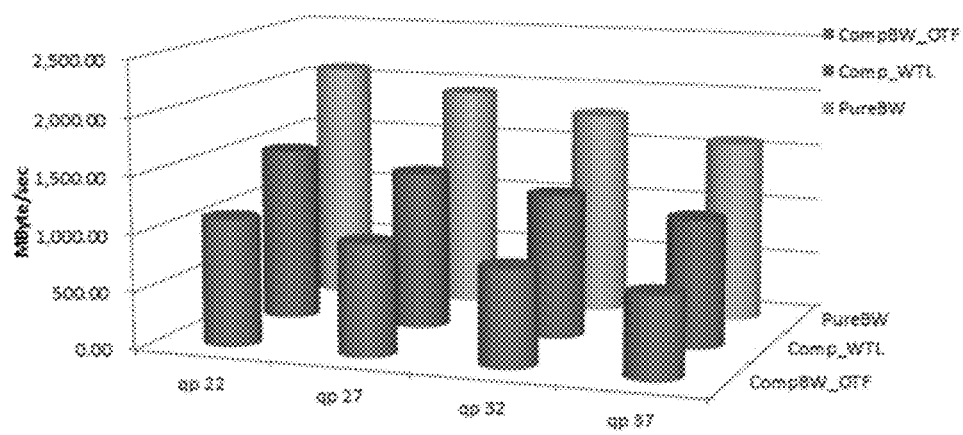
Figure 16:
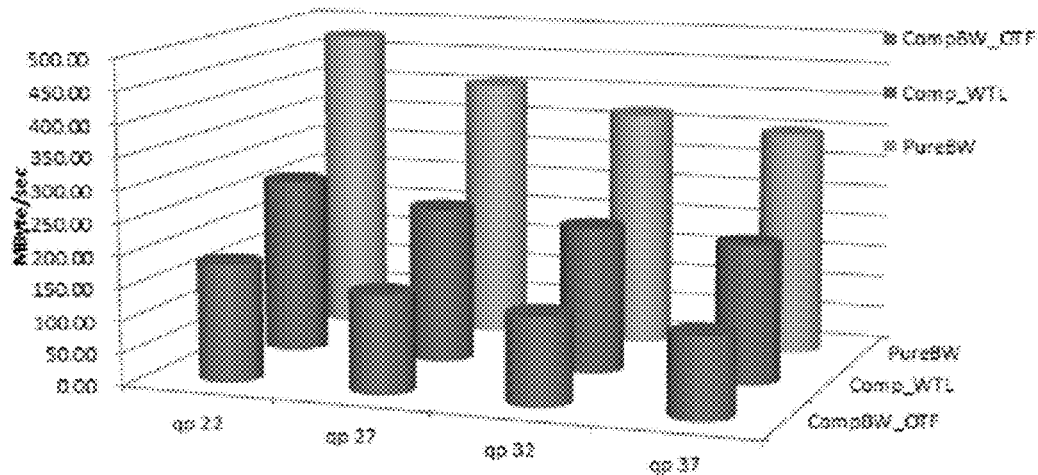
Figure 17:
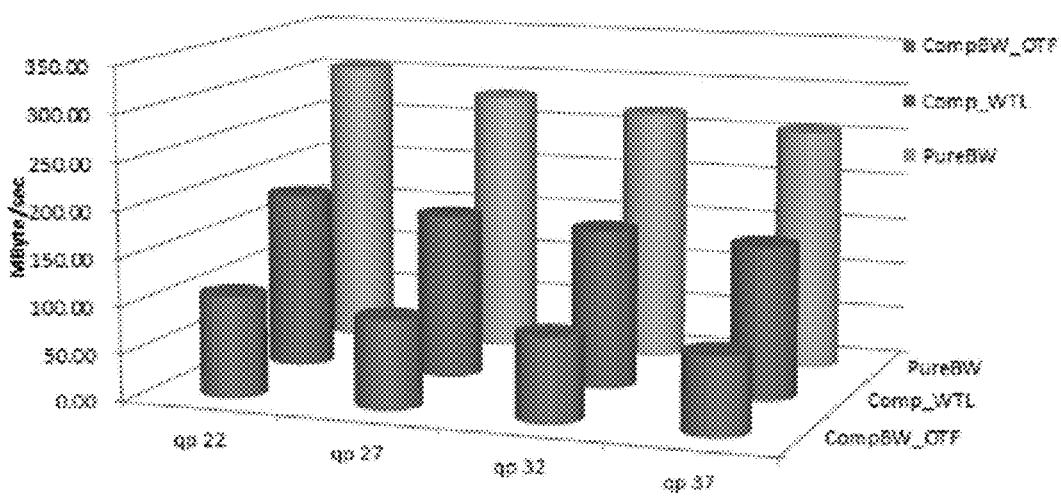
Figure 18:
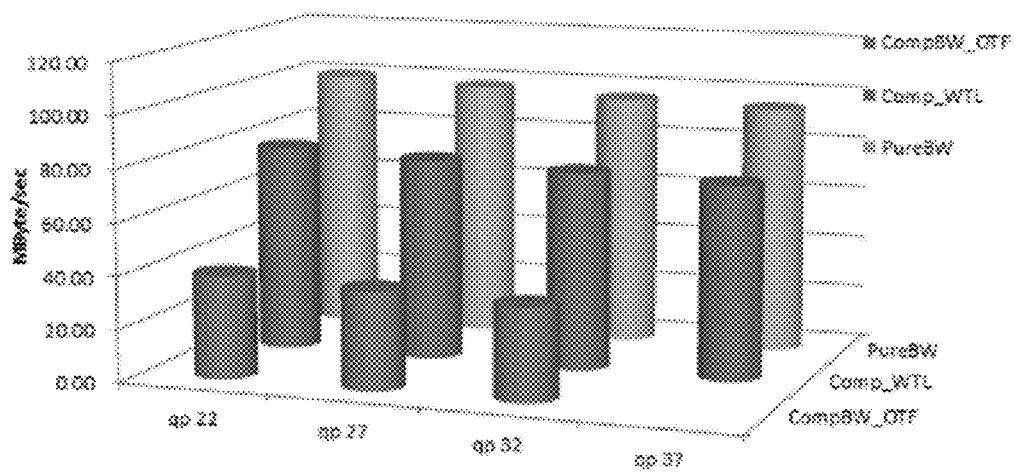

FIGS. 13 and 14 illustrate compensation results in a classifying manner of average bandwidths due to a frame buffer compression of the video processing method according to the embodiment disclosed herein and pure bandwidths without compression performed.

FIG. 13 illustrates a bandwidth reduction rate when the decoding apparatus illustrated in FIG. 1 processes a video in accordance with one exemplary embodiment of the present invention, and FIG. 13 illustrates a bandwidth reduction rate when the decoding apparatus illustrated in FIG. 2 processes a video in accordance with another exemplary embodiment of the present invention.

Meanwhile, FIGS. 15 to 18 are graphs visually illustrating comparison results according to each condition as FIGS. 13 to 14. As can be understood through the graphs, a remarkable bandwidth reduction can be obtained according to the embodiment of the present invention.

Figure 19:
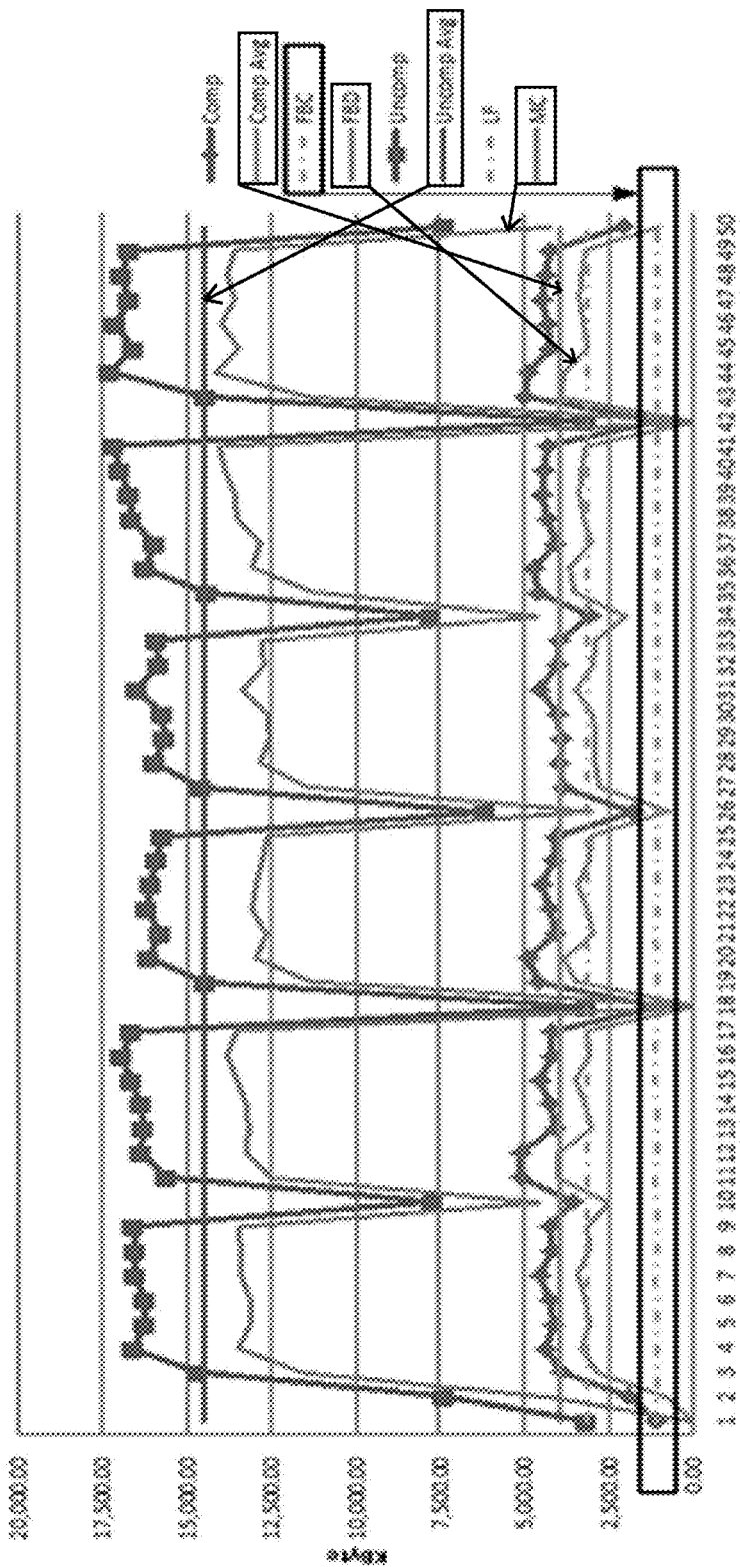

FIG. 19 also illustrates maintenance of bandwidth stability as well as the bandwidth reduction according to the video processing method according to the exemplary embodiment of the present invention. With regard to results of the frame buffer compression (line marked with FBC) according to the embodiment of the present invention in FIG. 19, it can be understood that an almost uniform value is maintained in spite of the drastic change of uncompressed image information while about 70% of bandwidths is reduced rather than uncompression (Uncomp). Therefore, the present invention can maintain bandwidth stability and derive an advantageous result for cache design.

Figure 20:
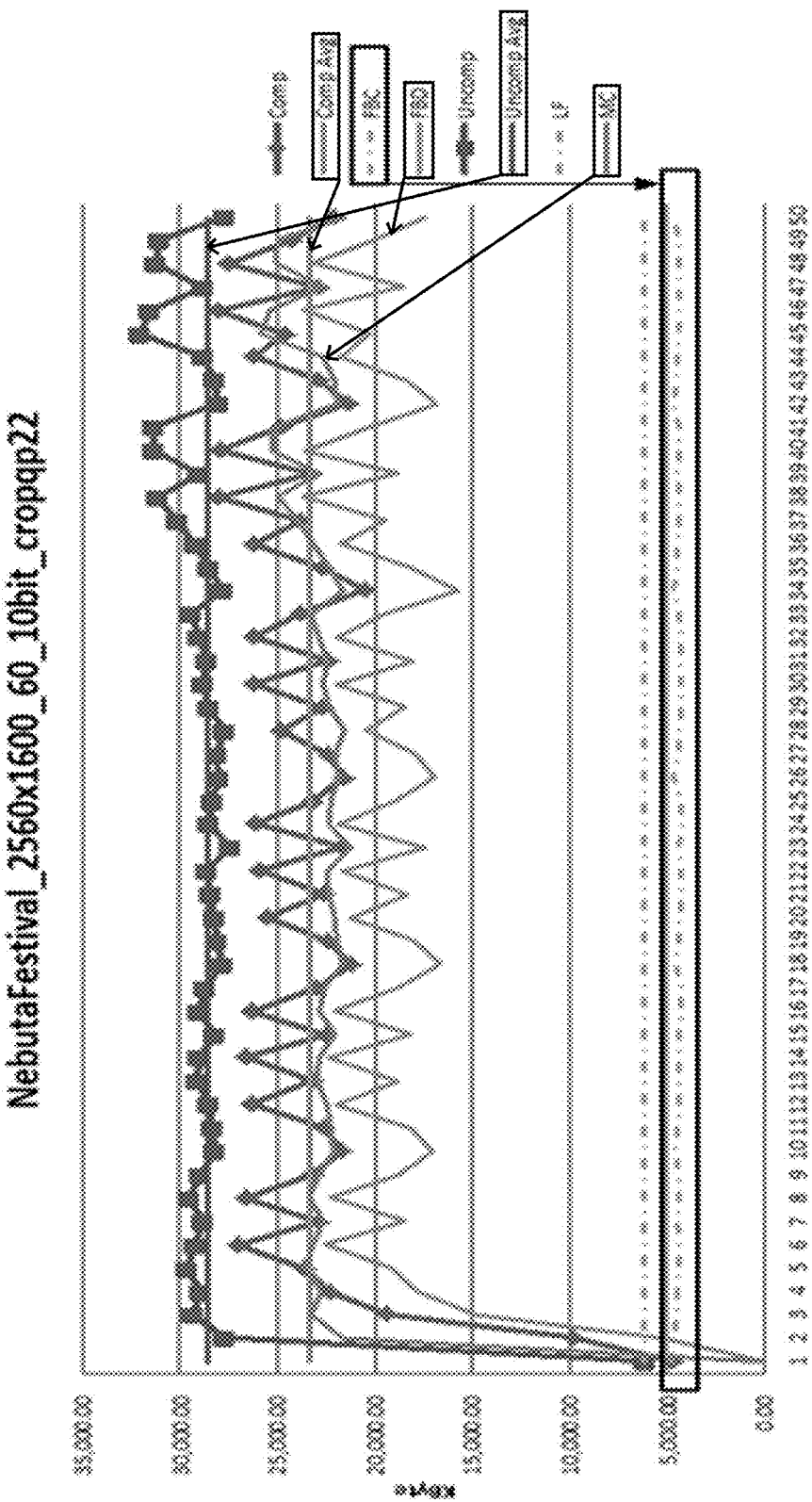

FIG. 20 illustrates that an average bandwidth upon the frame buffer compression (line marked with FBC) is reduced below 20% rather than a bandwidth of uncompressed (Uncomp) data. The embodiment according to the present invention can allow for processing high-resolution image while maintaining image quality by virtue of the bandwidth reduction.

The aforementioned methods according to the present invention can be written as computer programs to be implemented in a computer and be recorded in a computer readable recording medium. Examples of the computer readable recording medium include read-only memory (ROM), random-access memory (RAM), CD-ROMs, magnetic tapes, floppy disks, optical data storage devices, and carrier waves, such as data transmission through the Internet.

The computer readable recording medium can also be distributed over network coupled computer systems so that the computer readable code is stored and executed in a distributed fashion. Also, functional programs, codes, and code segments for accomplishing the present invention can be easily construed by programmers skilled in the art to which the present invention pertains.

While exemplary embodiments of the present invention have been shown and described, the present invention is not limited to the described exemplary embodiments. Instead, it would be appreciated by those skilled in the art that various changes and modifications may be made to these exemplary embodiments without departing from the spirit and scope of the invention as defined by the appended claims, and these changes and modifications are not construed as being separated from the technical idea and prospects of the present invention.

The invention claimed is:

1. A video processing apparatus for processing motion compensation of a plurality of frames, the video processing apparatus comprising:
   an image receiver receiving encoded data;
   a filter filtering an image frame reconstructed from the encoded data;
   a block dividing processor dividing a reference frame into a plurality of blocks in a predetermined block dividing unit, wherein the reference frame is obtained from the filtered image frame and is transmitted to process the motion compensation of the plurality of frames, and each of the plurality of blocks has an identical size;
   a compression processor selectively compressing each of the plurality of blocks, which is received from the block dividing processor, in a lossless compression method on a basis of reduction or non-reduction of bandwidths with respect to a frame buffer memory that contains the reference frame and packaging the plurality of blocks in a unit of a burst group, wherein a size of the burst group corresponds to a burst length of the frame buffer memory; and
   the frame buffer memory that is configured to record the packaged data and to provide the reference frame for the motion compensation.

2. The apparatus of claim 1, the block dividing processor comprising:
   a dividing structure determining processor determining whether a horizontal length or a vertical length of a picture of the image frame is a multiple of the predetermined block dividing unit and deciding a dividing structure.

3. The apparatus of claim 2,
   wherein the dividing structure determining processor determines boundary blocks including a boundary region of the picture, wherein the boundary region is smaller than a size of the predetermined block dividing unit, and
   the block dividing processor comprising:
   a boundary padding processor padding the boundary blocks.

4. The apparatus of claim 3,
   wherein the boundary blocks includes the boundary region and non-picture region, and
   wherein the boundary padding processor padding the non-picture region using boundary pixels of the boundary region.

5. The apparatus of claim 3,
   wherein the block dividing processor performs block dividing with respect to the picture using the padded boundary blocks, and outputs the plurality of blocks having the identical size.

6. The apparatus of claim 1,
wherein the compression processor performs compression for each of the plurality of the blocks using a plurality of code words different from each other.

7. The apparatus of claim 1,
further comprising:
an uncompression processor processing an image signal output from the filter in an uncompression manner and transferring the uncompressed image signal; and
an output module displaying the uncompressed image signal.

8. A video processing method for a video processing apparatus, the method comprising:
receiving an encoded image;
filtering an image frame reconstructed from the encoded image;
dividing a reference frame into a plurality of blocks in a predetermined block dividing unit, wherein each of the plurality of blocks has an identical size and outputting the plurality of blocks;
determining a compression method selectively using a lossless compression method on a basis of reduction or non-reduction of bandwidths with respect to a frame buffer memory with respect to each of the plurality of blocks;
compressing each of the plurality of blocks according to the compression method;
packaging the plurality of blocks in a unit of a burst group, wherein a size of the burst group corresponds to a burst length of the frame buffer memory; and
recording the packaged data and providing the reference frame for motion compensation.

9. The method of claim 8, the outputting comprising:
determining whether a horizontal length or a vertical length of a picture of the image frame is a multiple of the predetermined block dividing unit and deciding a diving structure.

10. The method of claim 9, wherein the step of the deciding the dividing structure comprises determining boundary blocks including a boundary region of the picture, wherein the boundary region is smaller than a size of the predetermined block dividing unit, and the step of the outputting comprises padding the boundary blocks.

11. The method of claim 10, wherein the boundary blocks includes the boundary region and non-picture region, and the step of the padding
comprises padding the non-picture region using boundary pixels of the boundary region.

12. The method of claim 10, the step of the outputting comprises:
dividing the picture using the padded boundary blocks, and
outputting the plurality of the blocks having the identical size.

13. The method of claim 8, the step of the compressing comprising:
performing compression for each of the plurality of the blocks using a plurality of code words different from each other.

14. A non-transitory computer readable medium storing a program causing a computer to execute a video processing method for a video processing apparatus, the method comprising:
receiving an encoded image;
filtering an image frame reconstructed from the encoded image;
dividing a reference frame into a plurality of blocks in a predetermined block dividing unit, wherein each of the plurality of blocks has an identical size and outputting the plurality of blocks;
determining a compression method selectively using a lossless compression method on a basis of reduction or non-reduction of bandwidths with respect to a frame buffer memory with respect to each of the plurality of blocks;
compressing each of the plurality of blocks according to the compression method;
packaging the plurality of blocks in a unit of a burst group, wherein a size of the burst group corresponds to a burst length of the frame buffer memory; and
recording the packaged data and providing the reference frame for motion compensation.

15. The non-transitory computer readable medium of claim 14, the outputting comprising: determining whether a horizontal length or a vertical length of a picture of the image frame is a multiple of the predetermined block dividing unit and deciding a diving structure.

16. The non-transitory computer readable medium of claim 15, wherein the step of the deciding the dividing structure comprises determining boundary blocks including a boundary region of the picture, wherein the boundary region is smaller than a size of the predetermined block dividing unit, and the step of the outputting comprises padding the boundary blocks.

17. The non-transitory computer readable medium of claim 16, wherein the boundary blocks includes the boundary region and non-picture region, and the step of the padding comprises padding the non-picture region using boundary pixels of the boundary region.

18. The non-transitory computer readable medium of claim 16, the step of the outputting comprises:
dividing the picture using the padded boundary blocks, and
outputting the plurality of the blocks having the identical size.

19. The non-transitory computer readable medium of claim 14, the step of the compressing comprising:
performing compression for each of the plurality of the blocks using a plurality of code words different from each other.

* * * * *